United States Patent
Cartier et al.

(10) Patent No.: US 7,015,267 B2
(45) Date of Patent: Mar. 21, 2006

(54) POLYETHYLENE TEREPHTHALATE COMPOSITIONS

(75) Inventors: Herve Cartier, Bergen op Zoom (NL); Franciscus Petrus Maria Mercx, Bergen op Zoom (NL); Antonius Adrianus Marinus de Vries, Zundert (NL); Sanjay Mishra, Evansville, IN (US); Luc Govaerts, Mt. Vernon, IN (US)

(73) Assignee: General Electric Company, Schenectady, NY (US)

( * ) Notice: Subject to any disclaimer, the term of this patent is extended or adjusted under 35 U.S.C. 154(b) by 309 days.

(21) Appl. No.: 10/319,920

(22) Filed: Dec. 17, 2002

(65) Prior Publication Data

US 2004/0116572 A1 Jun. 17, 2004

(51) Int. Cl.
*C08K 3/28* (2006.01)
*C08K 3/38* (2006.01)

(52) U.S. Cl. .............. 524/404; 524/429; 524/451; 524/492; 524/518; 525/57; 528/308.1; 528/308.3; 528/491

(58) Field of Classification Search .......... 524/404, 524/429, 451, 492, 518; 525/57; 528/308.1, 528/308.3, 491
See application file for complete search history.

(56) References Cited

U.S. PATENT DOCUMENTS

| | | | |
|---|---|---|---|
| 3,629,366 A | | 12/1971 | Brinkman |
| 3,907,754 A | | 9/1975 | Tershansy et al. |
| 4,020,049 A | | 4/1977 | Rinehart |
| 4,098,845 A | * | 7/1978 | Keck .................. 525/177 |
| 4,223,113 A | | 9/1980 | Bier et al. |
| 4,425,470 A | | 1/1984 | Garcia |
| 4,435,546 A | | 3/1984 | Bier et al. |
| 4,451,606 A | | 5/1984 | Campbell |
| 4,647,650 A | * | 3/1987 | Sasaki et al. ........... 528/274 |
| 4,705,844 A | * | 11/1987 | Espenschied et al. ..... 528/275 |
| 4,880,860 A | * | 11/1989 | Blocker ................ 524/94 |
| 5,041,476 A | | 8/1991 | Wilder |
| 5,051,528 A | * | 9/1991 | Naujokas et al. .......... 560/78 |

FOREIGN PATENT DOCUMENTS

| | | |
|---|---|---|
| DE | 10002154 | 7/2001 |
| DE | 10048720 | 4/2002 |
| EP | 0390489 | 10/1990 |
| JP | 11181063 | 7/1999 |

* cited by examiner

*Primary Examiner*—Kriellion A. Sanders
(74) *Attorney, Agent, or Firm*—Oppedahl & Larson LLP

(57) ABSTRACT

A method for increasing the crystallization rate of a polyethylene terephthalate (PET) prepared based on terephthalic acid (TPA) and ethylene glycol monomers, by adding into said TPA-based PET an effective amount of a polyethylene terephthalate prepared based on dimethyl terephthalate (DMT), in an amount sufficient for said thermally formable composition to have an increase in crystallization temperature as required for the final end-use application.

16 Claims, 1 Drawing Sheet

POLYETHYLENE TEREPHTHALATE COMPOSITIONS

FIELD OF THE INVENTION

The invention relates generally to polyethylene terephthalate (PET) compositions, which crystallize rapidly.

BACKGROUND

Thermoplastic polyesters, e.g., poly(ethylene terephthalate) or PET, have many commercial applications for use in fabrics, films, containers, and the like, due to their mechanical strength, flexural characteristics, clarity, thermal stability, impact strength, and permeability characteristics. PET can also be used as an engineering plastic, wherein compounded glass filled compositions are injection molded for electrical, electronics, or automotive applications, etc. During injection molding high crystallization temperatures (Tc) are needed in order to get short cycle times, low warpage and molded articles that have sufficient crystallinity. Crystallinity is desirable in engineering applications due to the higher thermal and mechanical stability associated with crystallinity.

In spite of PET's many desirable characteristics, PET is known as a slow crystallizing polymer. It is known that PET crystallization temperature or Tc strongly depends on the diethylene glycol content incorporated into the PET chains during the early stages of polymerisation. Prior art methods to increase the rate of crystallization of PET have been directed toward incorporation of inorganic compounds, salts, and polyolefins into PET to act as nucleation aids. The use of the nucleating agents, while often have a desired effect on the crystallization rate, sometimes have adverse consequences, such as lowering the mechanical properties or its molecular weight There exists a need in the art for a method to accelerate the rate of crystallization of PET in compositions without the limitations of the prior art.

SUMMARY OF THE INVENTION

The invention relates to a method to improve the crystallization rate of PET prepared based on terephthalic acid (TPA) by blending in an effective amount of a more rapidly crystallisable PET, a PET prepared based on dimethyl terephthalate (DMT).

In one aspect of the invention, a method to control dimensional stability of molded parts by effectively varying the ratio of DMT-PET and TPA-PET based polyester components in the composition forming such part, thus optimizing molding cycle time.

The invention further relates to PET compositions comprising a blend of a PET prepared based on terephthalic acid (TPA) and an effective amount of a PET prepared based on dimethyl terephthalate (DMT).

DESCRIPTION OF THE INVENTION

Figure 1:
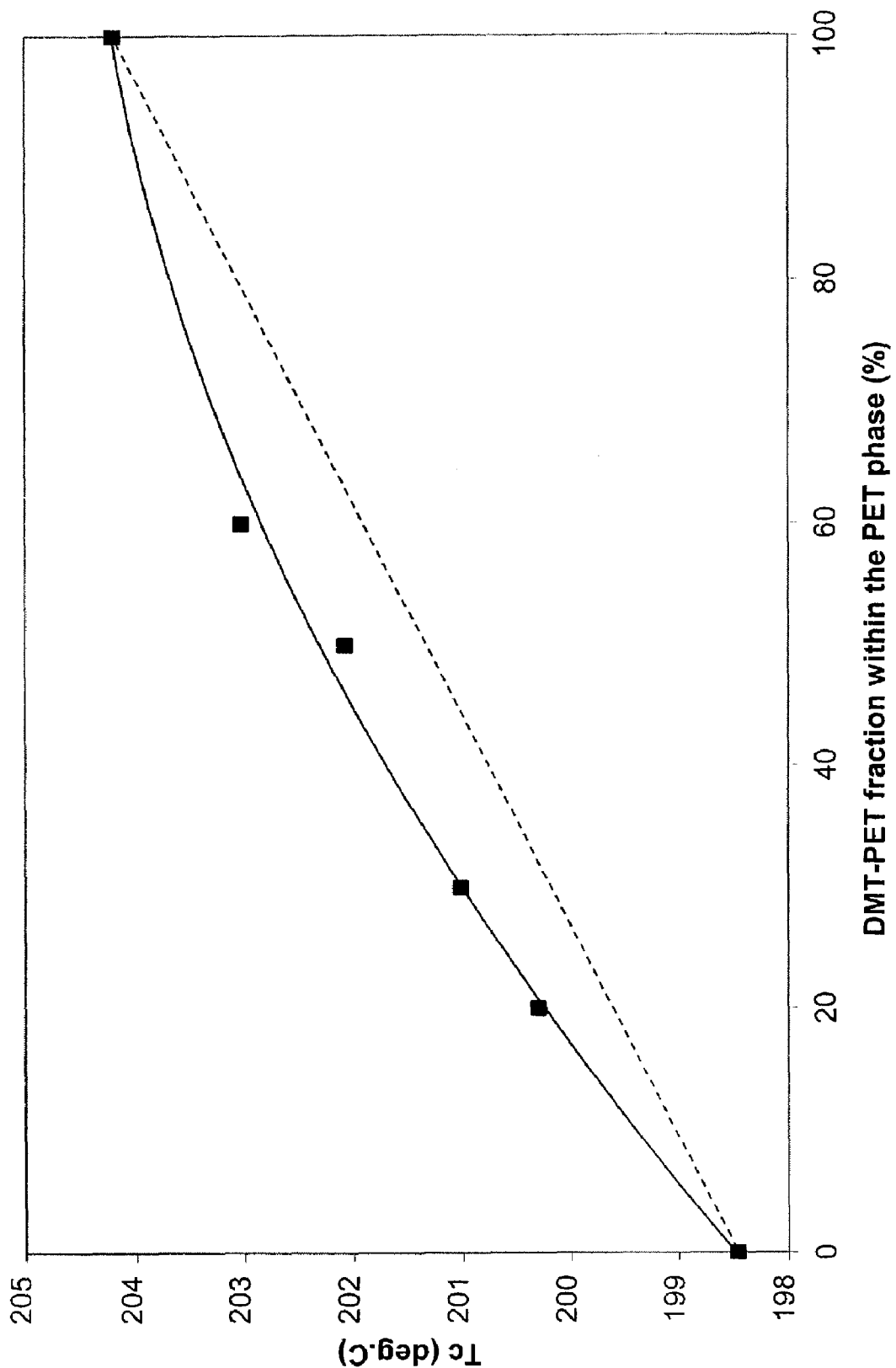
FIG. 1 illustrates the synergistic effect of DMT-based PET in a DMT/TPA-based polyester blend.

Polyester polymers of terephthalic acid and ethylene glycol, or PET, are usually produced by one of two different processes, namely: (1) The direct esterification and then polymerization of pure terephthalic acid (TPA) with an excess of the corresponding alkanediol, e.g., ethylene glycol. (2) Transesterification of a dialkyl terephthalate, e.g., a (lower) C1-C6 alkyl terephthalate such as dimethylterephthalate (DMT) and ethylene glycol to form, as known in the art, "DMT monomer." The transesterification usually takes place in the presence of a manganese, zinc, titanium, antimony or lithium catalyst. The DMT transesterification product is a mixture of ester products (low molecular weight polymer) in which most of the end groups are glycoxyl, and the mixture contains molecules with a degree of polymerization that is 1, 2, or 3. The DMT transesterification product is then further polymerized to high molecular weight polymer in the presence of a catalyst.

PET formed via process (1) is often referred to as TPA-based PET, wherein PET formed via process (2) is referred to as DMT-based PET. The first method is generally recognized to produce a faster rate of polymerization, for a commodity-based PET. The second method to make PET is at a slower rate of polymerization, for a more expensive PET end-product with a lower diethylene glycol (DEG) content and a higher crystallization temperature (for a PET with the same comparable intrinsic viscosity range). The following table 1 demonstrates the typical values of the two PET types, DMT-based and TPA-based, wherein the intrinsic viscosity (IV) is intrinsic viscosity in deciliters/gram as measured in 60/40 phenol/1,1,2,2-tetrachloroethane at 25° C. Crystallization temperature (Tc) is determined by differential scanning calorimeter using a Perkin Elmer® DCS7, comparing samples of DMT-based PET, TPA-based PET, 20 wt. % glass filled DMT-based TPA, and 20 wt. % glass-filled TPA-based PET. The thermograms were obtained using a heating and cooling regime consisting of: heating to 280° C., holding for 1 minute and cooling to 30° C. at a cooling rate of 80° C./min.

TABLE 1

Comparative Values of DMT and TPA based PET

| Sample | Viscosity (dl/g) | DEG (wt. %) | Tc (° C.) |
| --- | --- | --- | --- |
| DMT-PET | 0.6 | 0.8 | 184 |
| TPA-PET | 0.6 | 1.2 | 173 |
| DMT-PET w/ 20 wt % glass | 0.6 | 0.8 | 204 |
| TPA-PET w/ 20 wt % glass | 0.6 | 1.2 | 198 |

DMT-based PET as shown above, inherently has a higher crystallizing rate than TPA-based PET. Applicants have surprisingly found a synergistic increase in crystallization temperature of a commodity PET (TPA-based) by blending the composition with a fast crystallizing PET (DMT based). Applicants have also found that the PET blend, i.e., DMT-based and TPA-based, of the present invention demonstrate a particularly pronounced synergistic effect in the presence of a nucleating agent, e.g., an organic nucleating agent such as sodium stearate or an inorganic agent such as ultra fine talcum.

TPA-based PET Component. The TPA-based PET component herein refers to the PET produced based on using terephthalic acid and ethylene glycol as monomers. The TPA-based PET can be made in a manner as set forth in U.S. Pat. No. 4,020,049, which is hereby incorporated with regard to the method of making the TPA-based PET resin component.

Besides the TPA and ethylene glycol monomers, the TPA-based PET may be optionally modified with other monomers, e.g., 1,4-cyclohexanedimethanol, other glycols, isophthalic acid, and other dicarboxylic acid modifiers. The TPA-based PET may contain a copolymerizable component such as an aromatic dicarboxylic acid component such as phthalic acid, isophthalic acid, 5-sulfoisophthalic acid (sodium salt), 2,6-naphthalenedicarboxylic acid, 4,4'-diphenyldicarboxylic acid or diphenylsulfodicarboxylic acid; an aromatic polycarboxylic acid component such as trimellitic acid, pyromellitic acid or an acid anhydride thereof; an aliphatic dicarboxylic acid component such as oxalic acid, succinic acid, adipic acid, sebacic acid, azelaic acid or decanedicarboxylic acid; an aliphatic diol component such as 1,2-propanediol, 1,3-propanediol, 1,2-butanediol, 1,3-butanediol, 1,4-butanediol, 2,3-butanediol, diethylene glycol, 1,5-pentanediol, neopentyl glycol, triethylene glycol or poly(ethylene glycol); an aliphatic polyhydric alcohol component such as trimethylolpropane or pentaerythritol; an alicyclic diol component such as. 1,4-cyclohexanedimethanol or 1,4-cyclohexanediethanol; or a hydroxycarboxylic acid component such as 4-hydroxybenzoic acid or .epsilon.-caprolactone, in small amounts.

The TPA-based PET component may be branched or linear. In one embodiment with the addition of a branching agent to the reaction of the glycol and dicarboxylic acid components, the melt strength of the resulting TPA-based PET may be increased. Small amounts, typically less than about 2 mole %, of conventional branching agents may be reacted with the glycol component and dicarboxylic acid component to form the inventive polyesters. Conventional branching agents include polyfunctional acids, anhydrides, alcohols and mixtures thereof. Examples of suitable branching agents, include, but are not limited to, trimellitic anhydride, pyromellitic dianhydride, glycerol, trimethylolpropane, and pentaerythritol.

TPA-based PET generally has a higher diethylene glycol (DEG) content than a DMT-based PET. In one embodiment, the TPA-based PET has a DEG content of more than 1 wt. %. In a second embodiment, the TPA-based PET has a DEG content of more than 1.1 wt. %. In yet a third embodiment, 1.2 wt. % or more.

It should be noted that recycled (or scrap) as well as virgin TPA-based PET can be used in the process and composition of the present invention. Scrap PET includes polyester trimmed from molded articles, articles rejected due to quality imperfections and recycled post consumer scrap. The scrap polyester can be added to process lines making TPA-based PET, or can be used in regrind form as 100% scrap materials, or mixed with virgin TPA-based PET resins.

DMT-based PET Component. The DMT-based PET component is made via a process as described in U.S. Pat. No. 3,907,754, in which dimethylterephthalate is reacted with ethylene glycol, in the presence of a catalyst with a transesterification reaction, yielding a bishydroxyethyl terephthalate compound, that is further polymerised to high molecular weight PET. Many known catalysts may be employed in the transesterification reaction. Typical polyesterification catalysts which may be used include titanium alkoxides, dibutyl tin dilaurate, and antimony oxide or antimony triacetate, used separately or in combination, optionally with zinc, manganese, or magnesium acetates or benzoates and/or other such catalyst materials as are well known to those skilled in the art.

DMT-based PET generally has a lower diethylene glycol (DEG) content than a TPA-based PET. In one embodiment, the DMT-based PET has a DEG content of less than 1 wt. %. In a second embodiment, the DMT-based PET has a DEG content of less than 0.9 wt. %. In yet a third embodiment, 0.8 wt. % or less.

As with TPA-based polyesters, recycled (or scrap) as well as virgin DMT-based PET can be used in the present invention. The scrap polyester can be added to the process of making DMT-based PET, or can be used in regrind form as 100% scrap materials, or mixed with virgin DMT-based PET resins.

In one embodiment of the invention, the DMT-based PET component is blended into the TPA-based PET component in an effective amount to increase the crystallization rate of the overall composition to meet the dimensional control and stability requirements of the final molded article. In another embodiment, it is blended in a sufficient amount for sufficient shorter cycle time as required by the injection molding process. In one embodiment, the ratio of DMT-based PET to TPA-based PET is in the range of 5:95 to about 95:5. In a second embodiment, it is in the range of about 15:85 to 85:15. In yet a third embodiment, in the range of 25:75 to 75:25. In a fourth embodiment, about 40:60 to 60:40.

Optional nucleating agents. In one embodiment of the invention, nucleating agents are used to further accelerate the crystallization rate of the PET blend. Examples of nucleating agents include, but are not limited to:

a) non-organic compounds, such as carbon black, calcium carbonate, synthetic silicic acid and silicate salt, zinc white, high-sight clay, kaolin, basic magnesium carbonate, mica, talc, quartz powder, diatomaceous earth, dolomite powder, titanium oxide, zinc oxide, antimony oxide, barium sulfate, calcium sulfate, alumina, calcium silicate, and boron nitride;

b) low molecular weight organometallic compounds containing metal salts having a carboxyl group, such as metal salts of octanoic acid, toluic acid, heptaroic acid, pelargonic acid, lauric acid, myristic acid, palmitic acid, stearic acid, behenic acid, cerothic acid, montanic acid, mellitic acid, benzoic acid, p-t-butylbenzoic acid, terephthalic acid, monomethylester terephthalate, isophthalic acid, monomethylester isophthalate, and the like;

c) high molecular organometallic compounds containing metal salts having a carboxyl group, such as metal salts of polyethylene containing a carboxyl group obtained by oxidizing polyethylene;

d) polymeric organic compounds such as 3,3-dimethyl-1-butene, 3-methyl-1-butene, 3-methyl-1-pentene, 3-methyl-1-hexene, 3,5,5-trimethyl-1-hexene, and the like, polymers of vinylcycloalkane, polyalkyleneglycol, polyglycolic acid, cellulose, cellulose ester, and cellulose ether;

e) phosphates and phosphites including diphenyl phosphate, diphenyl phosphite, bis (4-t-butylphenyl) sodium phosphate, methylene (2,4-t-butylphenyl)sodium phosphate, and metal salts thereof;

f) sorbitol derivatives such as bis(p-methylbenzylidene) sorbitol and bis(p-ethylbenzylidene)sorbitol; mannitol and aliphatic esters thereof; and thioglycolic anhydride and paratoluenesulfonic acid, and metal salts thereof; and g) metal salt ionomers such as an alkali metal salt ionomer.

In one embodiment of the invention, the nucleating agents are selected from the group of sodium stearate, talcum, boron nitride, aluminum nitride, silica, PTFE, pyrazoles, and the like. The crystalline nucleating agent may be dispersed in either the TEP-based PET or DMT-based PET by introducing the crystalline nucleating agent while the PET or DMT-based polyester is being produced, or by kneading the crystalline nucleating agent into the polyester in the process of pelletizing the PET or DMT-based PET resins.

Optional Components. Optional components and additives may be incorporated separately into the DMT-based PET resin, or the TPA-based resin, prior to blending these two PET resin components together. For example, when colored polyesters are desired, pigments or colorants may be included in the reaction mixture during the reaction of the glycol component. In one embodiment, the optional components are added at the same time that the two PET resins are blended together.

Optional components and additives that may be compounded or blended into the composition of the invention in customary amounts include inert organic fillers, such as reinforcing agents, calcium carbonate, silicates, aluminas, lime and carbon, organic and inorganic pigments, dyestuffs, lubricants, release agents, UV absorbers, UV stabilisers, anti-oxidants, anti-ozonants, soil-proofing agents, stain-proofing agents, anti-static additives, anti-microbial agents, melt viscosity enhancers, flame retardants, impact modifiers, quenchers, fillers, processing aids, and the like.

Typical reinforcing agents include glass flakes, glass beads, glass fibers, and combinations thereof, or mineral reinforcements, such as talc, mica, clay, silica, mixtures of any of the foregoing and the like. In one embodiment, filamentous glass is used as filler.

Processing In one embodiment, the PET ingredients and optional components are pre-compounded, pelletized for further processing downstream into articles such as by extrusion, injection molding, blow molding, co-extrusion, thermoforming, or other processes. Pre-compounding can be carried out in conventional equipment, e.g., extruders and the like.

The compositions can be molded in any equipment conventionally used for thermoplastic compositions. For example, good results will be obtained in an injection molding machine, e.g. of the 85 ton Demag type. Those skilled in the art will be able to make the conventional adjustments in molding cycles to accommodate the composition, with the molding variables depending on the desired properties of the finished article, the amount of additives and/or reinforcing filler and the rate of crystallization of the polyester component.

EXAMPLES

These examples are provided to illustrate the invention but are not intended to limit the scope of the invention.

The following materials were used in the examples of the present invention:

TPA-based PET resin: commercially available from Sedapet-Catalana de Polimers under the trade name PET Br-T.

DMT-based PET resin: commercially available from E.I. duPont de Nemours ("DuPont"), under the trade name PET Crystar 3947-635, Nucleating agent: Ethylene Methacrylic acid ionomers, commercially available from DuPont, as Surlyn 8940.

Reinforcing materials: glass fibers from Nippon Electric Glass as T120.

Other additives: In some examples, sodium stearate is added as a nucleating agent. In other examples, Ultratalc from Specialty Minerals, Inc., is used. Irganox 1010 from Ciba Specialty Chemicals is used as an anti-oxidant. PETS or pentaerythrite tetrastearate from Henkel KGaA is used as a mold-release agent.

In all examples, a Werner&Pfleiderer ZSK-25 supercompounder is used for melt-blending the formulations with a targeted melt temperature of 280° C. The screw speed is set at 300 rpm and the throughput (kg/h) of the extruder is adjusted in order to reach a torque level of 80%.

Methods for determining the melting point and the degree of crystallinity are known in the art, for example, differential scanning calorimetry (DSC), density gradient tubes, and x-ray diffraction techniques. For DSC analysis, a sample to be analysed is heated up or cooled down together with a reference and the difference of heat flow to maintain both samples at the same temperature is monitored as a function of temperature or time. Crystallization and melting temperatures are recorded as the maximum of the absolute values of respectively the exothermic crystallization peak and the endothermic melting peak. In all examples, the crystallisation temperature is measured using a Perkin Elmer DSC-6 at a cooling rate of either 20 deg. C./min or 80 deg. C./min as stated in the next results table.

The results of the experiments are shown in Table 2 below, and also as shown in FIG. 1, wherein the blending of DMT-based PET into TPA-based PET compositions show a synergistic effect in increasing the crystallization temperature of the resulting blend, with the observed temperature being higher than a calculated (linear) temperature.

|  | Compare #1 | Run 2 | Run #3 | Run #4 | Compare #5 | Run #6 | Run #7 | Run #8 | Run #9 | Compare #10 | Run #11 |
|---|---|---|---|---|---|---|---|---|---|---|---|
| TPA-based PET resin - wt; % | 99.5 | 79.6 | 49.75 | 0 | 80.795 | 64.636 | 40.3975 | 16.159 | 0 | 99.5 | 79.6 |
| DMT-based PET resin - wt. % | 0 | 19.9 | 49.75 | 99.5 | 0 | 16.159 | 40.3975 | 64.64 | 80.795 | 0 | 19.9 |
| Glass fiber - wt. % | 0 | 0 | 0 | 0 | 15 | 15 | 15 | 15 | 15 | 0 | 0 |
| Sodium Stearate nucleating agent - wt. % | 0.2 | 0.2 | 0.2 | 0.2 | 0.275 | 0.275 | 0.275 | 0.275 | 0.275 | 0 | 0 |
| Untra Talc nucleating agent - wt. % | 0 | 0 | 0 | 0 | 0 | 0 | 0 | 0 | 0 | 0.2 | 0.2 |
| Surlyn 8940 nucleating agent - wt. % | 0 | 0 | 0 | 0 | 3.6 | 3.6 | 3.6 | 3.6 | 3.6 | 0 | 0 |
| Irganox 1010 antioxidant - wt. % | 0.1 | 0.1 | 0.1 | 0.1 | 0 | 0 | 0 | 0 | 0 | 0.1 | 0.1 |
| Irganox 1076 antioxidant - wt. % | 0 | 0 | 0 | 0 | 0.13 | 0.13 | 0.13 | 0.13 | 0.13 | 0 | 0 |
| PETS mold-release agent - wt. % | 0.2 | 0.2 | 0.2 | 0.2 | 0.2 | 0.2 | 0.2 | 0.2 | 0.2 | 0.2 | 0.2 |
| Tm (° C.) at 20 deg./min | 251.5 | 251.5 | 250.9 | 251.6 | 252.9 | 253.4 | 252.4 | 253.5 | 253.1 | 251.9 | 252.3 |
| Tc (° C.) at 20 deg./min | 209.2 | 211.8 | 214.5 | 215.6 | — | — | — | — | — | 210.1 | 213.6 |
| Tc (° C.) at 80 deg./min | — | — | — | — | 200.3 | 202.6 | 203.7 | 204.1 | 204.5 | — | — |
| Tc (° C.) calculated based on linear effect | 209.2 | 210.8 | 212.4 | 215.6 | 200.3 | 201.1 | 202.4 | 203.7 | 204.5 | 210.1 | 210.8 |

The invention claimed is:

1. A method for increasing the crystallization rate of a crystallisable polyethylene terephthalate (PET) composition prepared based on terephthalic acid (TPA) and ethylene glycol monomers by blending in said PET composition an effective amount of a polyethylene terephthalate prepared based on dimethyl terephthalate (DMT).

2. The method of claim 1, wherein said DMT-based PET is incorporated into said TPA-based composition in an amount of about 5–70 wt. %, based on the total weight of said PET composition.

3. The method of claim 1, wherein DMT-based PET is incorporated into said TPA-based composition in an amount sufficient to raise the crystallization temperature of said composition of at least 0.5 degree Celsius, compared to the crystallization temperature of a TPA-based PET composition without any addition of DMT-based PET.

4. The method of claim 1, further comprising blending into said PET composition a nucleating agent.

5. The method of claim 4, wherein said nucleating agent is selected from the group of talcum, boron nitride, aluminum nitride, silica, PTFE, a salt of organic compounds having acidic groups, pyrazole, or mixtures thereof.

6. The method of claim 1, further comprising forming said PET composition into an article by a process selected from one of extrusion, injection molding, blow molding, co-extrusion, and thermoforming.

7. The method of claim 1, wherein said polyethylene terephthalate (PET) composition prepared based on terephthalic acid (TPA) and ethylene glycol monomers is a recycled material.

8. The method of claim 1, wherein said polyethylene terephthalate prepared based on dimethyl terephthalate (DMT) is a recycled material.

9. A thermally formable composition comprising a blend of a polyethylene terephthalate (PET) prepared based on terephthalic acid (TPA) and ethylene glycol monomers, and an effective amount of a polyethylene terephthalate prepared based on dimethyl terephthalate (DMT), wherein said DMT-based PET is present in an amount sufficient for said thermally formable composition to have a crystallization temperature of at least 0.5 degree Celsius higher than a TPA-based PET composition without any DMT-based PET present.

10. The composition of claim 9, further comprising a nucleating agent.

11. The composition of claim 10, wherein said nucleating agent is selected from the group of talcum, boron nitride, aluminum nitride, silica, PTFE, a salt of organic compounds having acidic groups, pyrazole, or mixtures thereof.

12. The composition of claim 9, wherein said DMT-based PET is present in an amount of about 5–70 wt. %, based on the total weight of said PET composition.

13. An article comprising the composition of claim 9.

14. An article comprising a combination of a blend of a polyethylene terephthalate (PET) prepared based on terephthalic acid (TPA) and ethylene glycol monomers, and an effective amount of a polyethylene terephthalate prepared based on dimethyl terephthalate (DMT) in a ratio of 95:5 to 5:95.

15. The article of claim 13, wherein said TPA-based PET comprises pelletized scrap TPA-based PET materials.

16. The article of claim 13, wherein said DMT-based PET comprises pelletized scrap DMT-based PET materials.

* * * * *